US011488039B2

(12) United States Patent
Kota et al.

(10) Patent No.: US 11,488,039 B2
(45) Date of Patent: Nov. 1, 2022

(54) UNIFIED INTENT UNDERSTANDING FOR DEEP PERSONALIZATION

(71) Applicant: Microsoft Technology Licensing, LLC, Redmond, WA (US)

(72) Inventors: Nagaraj Kota, Bangalore (IN); Venkatesh Duppada, Andhra Pradesh (IN); Mohit Wadhwa, New Delhi (IN); Ashvini Kumar Jindal, Rajasthan (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 369 days.

(21) Appl. No.: 16/913,176

(22) Filed: Jun. 26, 2020

(65) Prior Publication Data

US 2021/0357784 A1   Nov. 18, 2021

(30) Foreign Application Priority Data

May 15, 2020   (IN) .............................. 202041020663

(51) Int. Cl.
| | | |
|---|---|---|
| *G06N 5/04* | (2006.01) | |
| *G06N 20/00* | (2019.01) | |
| *G06N 3/04* | (2006.01) | |
| *G06N 3/08* | (2006.01) | |
| *G06N 5/02* | (2006.01) | |

(52) U.S. Cl.
CPC .............. *G06N 5/04* (2013.01); *G06N 3/0454* (2013.01); *G06N 3/08* (2013.01); *G06N 5/022* (2013.01); *G06N 20/00* (2019.01)

(58) Field of Classification Search
CPC .......... G06N 5/04; G06N 3/0454; G06N 3/08; G06N 5/022; G06N 20/00
See application file for complete search history.

(56) References Cited

U.S. PATENT DOCUMENTS

| | | | |
|---|---|---|---|
| 9,251,516 | B2 | 2/2016 | Rudloff |
| 11,003,997 | B1 * | 5/2021 | Blackwood ........... G06F 16/951 |
| 2005/0216295 | A1 | 9/2005 | Abrahamsohn |
| 2008/0139112 | A1 | 6/2008 | Sampath et al. |
| 2011/0258049 | A1 | 10/2011 | Ramer et al. |
| 2012/0254098 | A1 | 10/2012 | Flinn et al. |
| 2013/0282605 | A1 | 10/2013 | Noelting et al. |
| 2014/0058954 | A1 | 2/2014 | Perlstein et al. |
| 2014/0136613 | A1 | 5/2014 | Chandar |

(Continued)

OTHER PUBLICATIONS

"Non Final Office Action Issued in U.S. Appl. No. 16/913,387", dated Apr. 25, 2022, 17 Pages.

(Continued)

*Primary Examiner* — Beemnet W Dada
(74) *Attorney, Agent, or Firm* — Schwegman Lundberg & Woessner, P.A.

(57) ABSTRACT

In an example embodiment, user interactions with a graphical user interface are modeled to derive an efficient representation that is highly available through a framework. This representation enables downstream analysis as to the relevancy of the user interactions through libraries leveraging standardized activity representations. With these components, it becomes possible to derive user intent in a modular fashion, domain by domain, while decoupling many system aspects, and also providing high capacity and precise intent information to leverage for personalization.

18 Claims, 8 Drawing Sheets

(56) References Cited

U.S. PATENT DOCUMENTS

| | | | |
|---|---|---|---|
| 2016/0034853 A1 | 2/2016 | Wang et al. | |
| 2016/0255034 A1 | 9/2016 | Yuan | |
| 2017/0300863 A1 | 10/2017 | Wang et al. | |
| 2017/0344556 A1 | 11/2017 | Wu et al. | |
| 2017/0344954 A1 | 11/2017 | Xu et al. | |
| 2017/0364596 A1 | 12/2017 | Wu et al. | |
| 2018/0060822 A1 | 3/2018 | Hou et al. | |
| 2018/0189739 A1 | 7/2018 | Kenthapadi et al. | |
| 2018/0248976 A1* | 8/2018 | Gibson | G06N 20/00 |
| 2019/0095868 A1 | 3/2019 | Zhang et al. | |
| 2019/0191200 A1* | 6/2019 | Panchaksharaiah | H04N 21/8456 |
| 2019/0349439 A1* | 11/2019 | Anders | G06F 16/955 |
| 2021/0065131 A1 | 3/2021 | Bixler et al. | |
| 2021/0081476 A1 | 3/2021 | Weinstein et al. | |
| 2021/0209643 A1* | 7/2021 | Manoharan | G06Q 30/0269 |
| 2021/0357869 A1 | 11/2021 | Wadhwa et al. | |
| 2022/0217214 A1* | 7/2022 | Ochiai | G06F 16/907 |

OTHER PUBLICATIONS

Bo, et al., "MatchZoo", Retrieved from: https://github.com/NTMC-Community/MatchZoo, Retrieved on Mar. 6, 2020, 4 Pages.

Bobadilla, et al., "Recommender Systems Survey", In Journal of Knowledge-Based Systems, vol. 46, Jul. 1, 2013, pp. 109-132.

Borisyuk, et al., "CaSMoS: A Framework for Learning Candidate Selection Models over Structured Queries and Documents", In Proceedings of the 22nd ACM SIGKDD International Conference on Knowledge Discovery and Data Mining, Aug. 13, 2016, pp. 441-450.

* cited by examiner

JOB_SEARCH MARKETING STRATEGY 502A

VIEW C_IM_FOODS_INC. DIRECTOR OF INTERNATIONAL PARTNERKotaPS 502B

VIEW C_HIREBETTER CHIEF EXECUTIVE OFFICER 502C

VIEW C_IM_FOODS_INC. DIRECTOR OF INTERNATIONAL PARTNERKotaPS 502D

VIEW C_WALLY_MEDIA_GROUP DIRECTOR, INTEGRATED MARKETING STRATEGY AND PLANNING 502E

FEED CLICK JOB OPENING, TURNOVER, INC. 502F

JOB_SEARCH MARKETING STRATEGY 502G

COURSE_SEARCH, EXTRA MARKEING SKILLS 502H

VIEW C_HIREBETTER CHIEF EXECUTIVE OFFICER 502I

COURSE_SEARCH, JAVA SKILLS 502J

APPLY_CLICK_OFFSITE C_HIREBETTER CHIEF EXECUTIVE OFFICER 502K

*FIG. 5*

UNIFIED INTENT UNDERSTANDING FOR DEEP PERSONALIZATION

CLAIM OF PRIORITY

The present patent application claims the priority benefit of the filing date of Indian Provisional Application No. 202041020663, filed May 15, 2020, the entire content of which is incorporated herein by reference.

TECHNICAL FIELD

The present disclosure generally relates to technical problems encountered in large computer networks. More specifically, the present disclosure relates to the use of machine learning techniques for unified intent understanding in large computer networks for deep personalization.

BACKGROUND

The rise of the Internet has occasioned two disparate yet related phenomena: the increase in the presence of social networking services, with their corresponding user profiles visible to large numbers of people, and the increase in the use of these social networking services to provide content. An example of such content is a social media post, where a user can post information, such as text, pictures, videos, articles, and the like for other users to view.

Social networking services act to ensure that user engagement, meaning the amount of time and effort a user spends engaging with the social networking service, is high. The result is that social networking services often offer multiple different types of content and multiple different opportunities to interact with data in different ways. These different opportunities may be called "channels."

For example, a social networking service may offer an opportunity for users to search for other members of the social networking service (a "search" channel), an area where content from or about other members is presented automatically to a member in reverse chronological order (a "feed" channel), an area where other members the member may know are automatically presented to the member (a "people-you-may-know" channel), an area where users can explore job listings (a "careers" channel), an area where users can explore courses to take (a "learning" channel), and so on. Additionally, certain other content, such as advertisements (an "ads" channel) can be presented in conjunction with various other channels.

Understanding and capturing user intent is a key aspect of maximizing user engagement. A user, for example, who is presented with relevant information at a time and through a mechanism that the user finds convenient and acceptable views that information positively. Improper targeting, however, can result in reduced user engagement. A user, for example, who is presented with irrelevant information or views the notifications as inconvenient or even bothersome (either due to the channel used or the substance of the content, or both) may be decrease their use of the social networking service.

Traditionally, machine learning algorithms have been utilized to aid in understanding user intent with respect to content. Specifically, training data containing examples of content that users did or didn't interact with are used as positive and negative signals, respectively, when training a machine learned model using a machine learning algorithm. These models, however, are domain/channel specific. For example, a model may be developed for the search channel, but this model does not apply to the careers channel. Not only are the models not transferrable to different channels, but the training data also is not transferrable to different channels. For example, a user clicking on a job posting may have a clear meaning as a piece of training data in a model trained for a careers channel, but the meaning of such an action may not have as clear a meaning in a feed channel, or a learning channel. A user may perform many of these types of actions in many different channels in a single session, and yet only a subset are utilized for an individual channel's model.

As a result, each channel, which really represents a different domain, is performing its own modeling of member interests based on a partial view of actions taken during a session. Not only does this lead to inefficiencies and inaccuracies in the models, it also wastes a valuable opportunity to capture cross-channel single-session data. For example, if a user clicks on a job listing and then also clicks on a member of the social networking service after a member search in the same session, then those actions may very well have been related and this relationship is lost if these actions are only considered independently by their respective channel models.

Thus, what is needed is a mechanism to capture intent of user-interaction across multiple channels in a single session.

BRIEF DESCRIPTION OF THE DRAWINGS

Some embodiments of the technology are illustrated, by way of example and not limitation, in the figures of the accompanying drawings.

FIG. 5 is a diagram illustrating an example Unified Activity Session (UAS), in accordance with the example embodiment.

DETAILED DESCRIPTION

Overview

Figure 1:
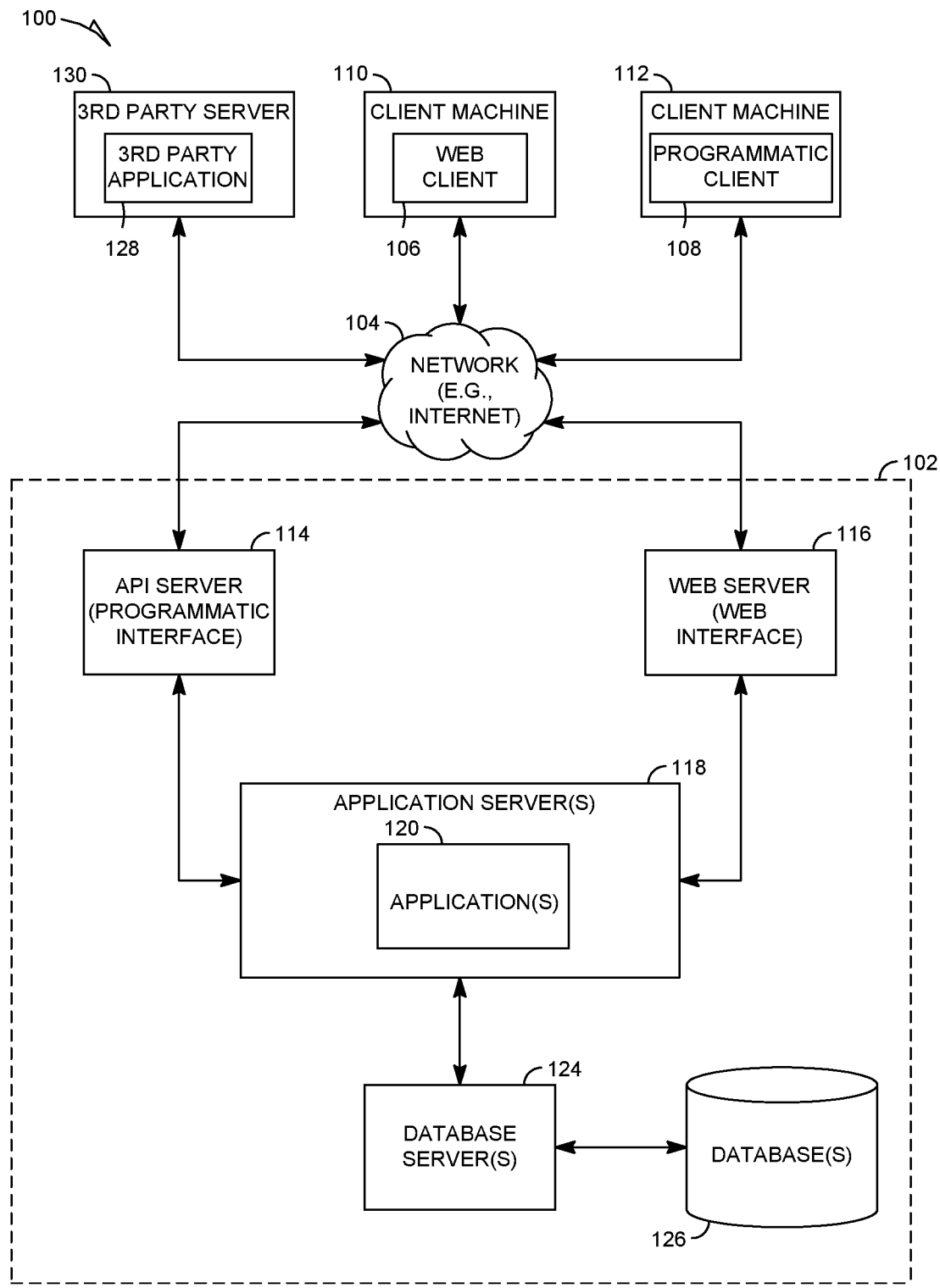
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, user interactions with a graphical user interface are modeled to derive an efficient representation that is highly available through a framework. This representation enables downstream analysis as to the relevancy of the user interactions through libraries leveraging standardized activity representations. With these components, it becomes possible to derive user intent in a modular fashion, domain by domain, while decoupling many system aspects, and also providing high capacity and precise intent information to leverage for personalization.

At a high-level, the objective of an example embodiment is to understand and represent user activities to enable real-time or near-real-time personalized experiences across a social networking service. Real-time means immediately, while near-real time is effectively real-time but without guaranteed deadlines. A base layer unifies and sessionizes users' heterogenous cross-channel site activities. A high-capacity efficient intent-representation called a Unified Activity Vector (UAV) can then be obtained using an activity embedding learning framework, leveraging natural language processing and deep-learning machine learning algorithms. High capacity mean that the representation can be used to handle large volume of data, at least on the order of the millions. The UAVs are stateful and may be updated on a periodic basis (e.g., daily). They may be persisted to a key-value store so as to be highly available online. Highly available means that the information is available for a greater than normal period.

UAVs can be leveraged to enable multiple downstream relevance tasks, such as query suggestions, identifying entities of interest, and identifying other users who have similar intent to a particular user. The latter may be retrieved using a Hierarchical Navigable Small World (HNSW) nearest-neighbor algorithm, which efficiently indexes UAVs.

In an example embodiment, arbitrary sequences of activities are consumed across domains/channels of users of a social networking service, and these sequences are quantified into a vector of d dimensions, one which various intents can be predicted at scale. For example, based on raw activity logs and site sessions, an example embodiment can predict that a given user has a job interest in marketing and business development, a learning interest of "growth mindset" and "negotiation skills," and a people connect interest to connect to others in the media industry. This may be predicted using a variable length of context (e.g., last two days, last week, last year) of activities, so that both short-term and long-term interest can be obtained.

DESCRIPTION

While the proposed methodology may be utilized for a number of different types of communications, in an example embodiment it is applied specifically to the case of job suggestions. For ease of discussion, the job suggestion embodiment will be described throughout this document, but the claims shall not be interpreted as limiting the scope of protection to job suggestions unless explicitly recited.

In an example embodiment, a user activity understanding and intelligence framework is provided to create a unified activity sequence of member activity across verticals, allow for understanding of these activity sequences to create smaller representations than normal and scalable model libraries (model libraries that can be used by large volumes of application), make these representations available for consumption via libraries, pretrained models, and ready-to-user presentations, and enable personalization in multiple downstream artificial intelligence tasks by plugging in artifacts.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
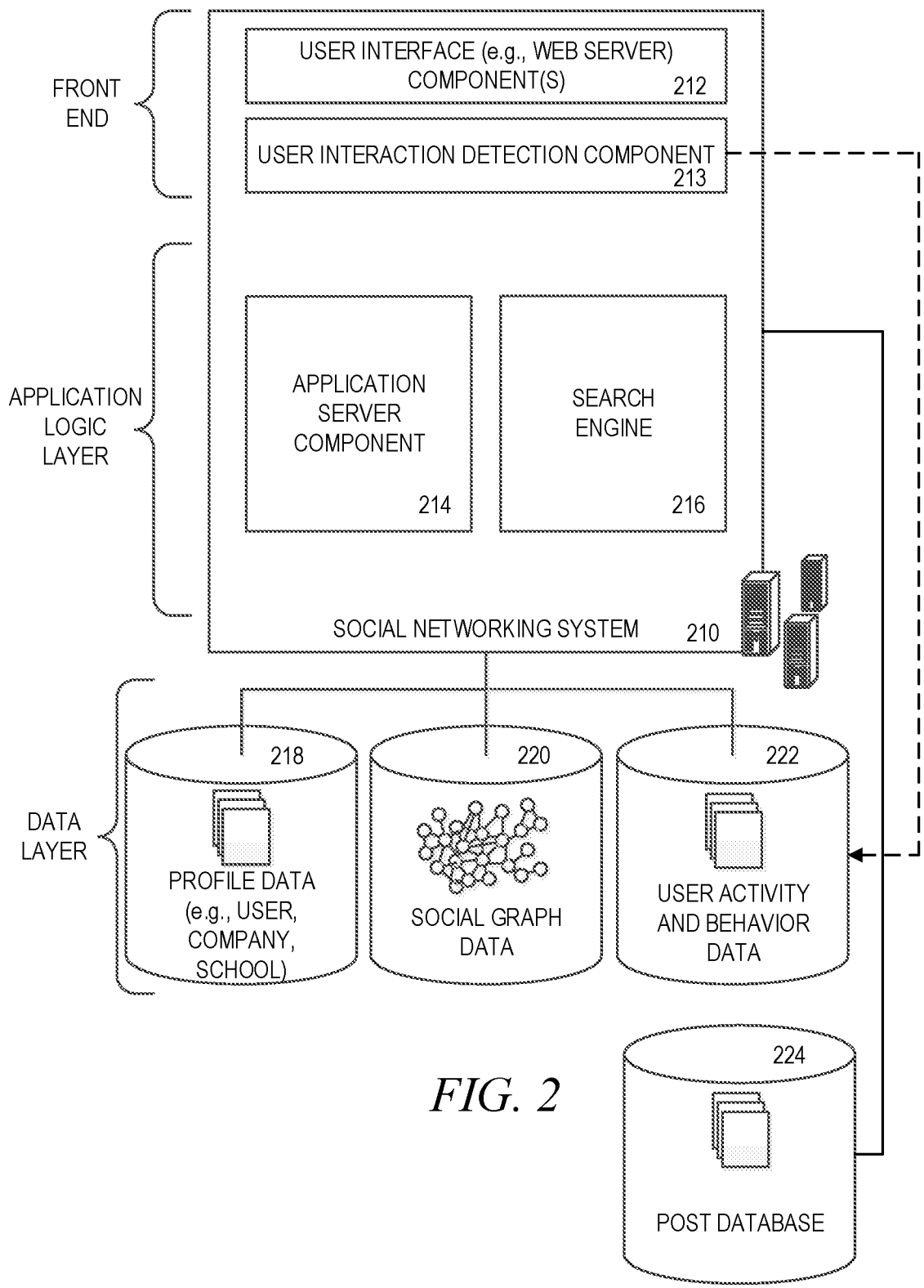
FIG. 2 is a block diagram showing the functional components of a social networking service, including a data processing component referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing component referred to herein as a search engine 216, for use in generating and providing search results for a search query, consistent with some embodiments of the present disclosure. In some embodiments, the search engine 216 may reside on the application server (s) 118 in FIG. 1. However, it is contemplated that other configurations are also within the scope of the present disclosure.

As shown in FIG. 2, a front end may comprise a user interface component (e.g., a web server 116) 212, which receives requests from various client computing devices and communicates appropriate responses to the requesting client devices. For example, the user interface component(s) 212 may receive requests in the form of Hypertext Transfer Protocol (HTTP) requests or other web-based API requests. In addition, a user interaction detection component 213 may be provided to detect various interactions that users have with different applications 120, services, and content presented. As shown in FIG. 2, upon detecting a particular interaction, the user interaction detection component 213 logs the interaction, including the type of interaction and any metadata relating to the interaction, in a user activity and behavior database 222.

An application logic layer may include one or more various application server components 214 operating on the application server(s) 118, which, in conjunction with the user interface component(s) 212, generate various user interfaces (e.g., web pages) with data retrieved from various data sources in a data layer. In some embodiments, individual application server components 214 are used to implement the functionality associated with various applications 120 and/or services provided by the social networking service.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API component via which applications 120 and services can access various data and services provided or maintained by the social networking service. For example, using an API, an application may be able to request and/or receive one or more recommendations. Such applications 120 may be browser-based applications 120 or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

As described above, example embodiments may be utilized for ranking and/or selection of social media posts to display to users. These social media posts may be directly or indirectly generated from user activity within the social networking service and may be stored in post database 224. Examples of social media posts directly generated from user activity include the users themselves posting text, image, or video information as a post. Examples of social media posts indirectly generated from user activity include the social networking service itself generating the post when the user has a change in their profile, when the user is mentioned in an article, and so forth.

Figure 3:
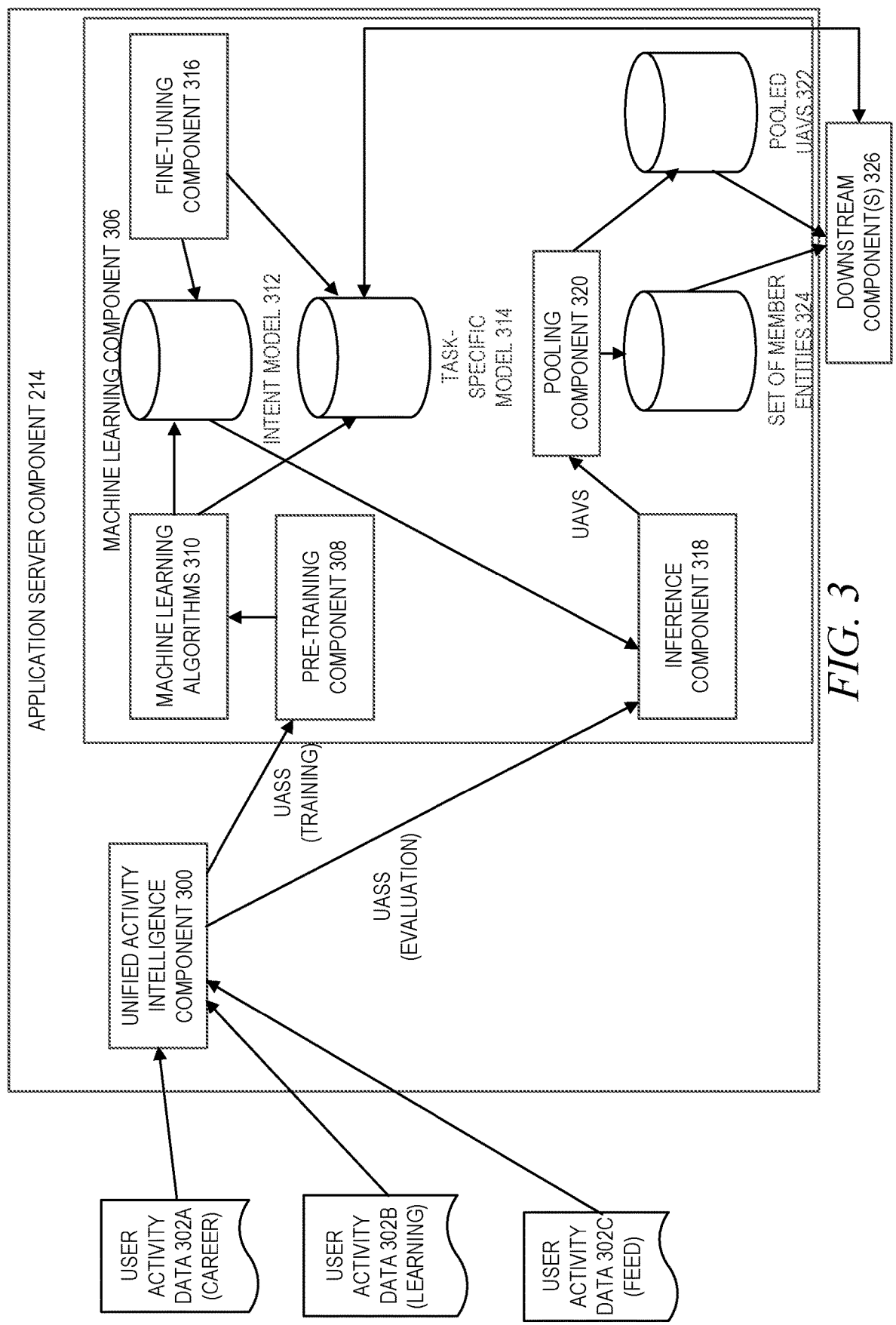
FIG. 3 is a block diagram illustrating an application server component of FIG. 2 in more detail, in accordance with an example embodiment.

FIG. 3 is a block diagram illustrating application server component 214 of FIG. 2 in more detail, in accordance with an example embodiment. While in many embodiments the application server component 214 will contain many sub-components used to perform various different actions within the social networking system 210, in FIG. 3 only those components that are relevant to the present disclosure are depicted.

Specifically, the application server component 214 may include a unified activity intelligence component 300 that obtains user activity data 302A, 302B, 302C. The user activity data 302A, 302B, 302C is from different channels within the social networking service. For example, user activity data 302A is from a careers channel, user activity data 302B is from a learning channel, and user activity data 302C is from a feed channel. While activity data from these three channels are depicted here, one of ordinary skill in the art will recognize that the user activity data can be from any number of different channels.

The unified activity intelligence component 300 aggregates the user activity data 302A, 302B, 302C and enriches the activity data with additional information. In an example embodiment, the type of the user interaction is one of the pieces of additional information used to enrich the activity data. For example, if the user activity information includes an interaction with the graphical user interface in which the user viewed a job listing, the user interaction type "viewed" may be added to the user activity information. Likewise, if the user activity information includes an interaction with the graphical user interface in which the user applied for a job associated with the job listing, the user interaction type "applied" may be added to the user activity information. Another example of information that can be used to enrich the activity data is information about the device (e.g., desktop or mobile) used to perform the interaction, or time-based information, such as the time of day when the interaction was performed.

The additional information with which to enrich the activity data is configurable based on channel, even at the individual type level. For example, not only is the decision as to whether to enrich the activity data with the type of the interaction configurable based on the channel, but also what types are available to classify the types of interaction and the entities to which the interaction applied. For example, in the career channel, action types may include view, search, and apply and the entities involved include company identification, job title, and skill identification. In the learning channel, for example, the action types may include view course, complete course, view video, complete video, and search query while the entities may include course identification, topic identification, and skill identification. In the feed channel, for example, the action types may include react, like, share, comment, connect, follow, and send message, while the entities may include user title, hashtags, and topic identification.

Once these enriching annotations are defined, they may be joined with raw timestamps from the activity data to enrich a particular site action. They may then be aligned and ordered in order to obtain a unified view of a user's actions in a given session.

The unified activity intelligence component 300 may also execute custom sessionization logic to sessionize the data. The customization may include defining an idle time for a session boundary, and this customization may also vary based on the channel. For example, a feed session may have a longer idle time than a careers session, as users may often become distracted with other things while performing a feed session but are still engaging in the same session when they return.

The results output by the unified activity intelligence component 300 include one or more Unified Activity Sessions (UASs). As will be seen, the UASs may be used for either training purpose (to train an intent model) or evaluation purposes (by an inference component that uses the intent model to make inferences about the UASs), or both.

A machine learning training component 306 may then consume the user UASs 304 and train one or more machine learned models to learn member activity representations. The machine learning training component 306 may contain a pre-training component 308 that performs one or more transformations on the UASs to make them ready for use as training data. These transformations may include, for example, adding one or more labels to each activity in the UASs. A label is a score or value indicative of the extent to which the corresponding activity satisfies a predictive goal of the model. Thus, if the model is to determine user intent, the label may indicate how strongly the corresponding action predicts the user's intent, positively or negatively. For example, the activity of viewing a job listing may be a somewhat positive indicator of the user's interest in the job listing, but the activity of applying for a job associated with the job listing is an even stronger positive indicator of the user's interest in the job listing. As such, a label for an apply action may be higher than a label for a view action.

One or more machine learning algorithms 310 may then be used to train two types of models. The first type of model is an intent model 312, which is a model trained to predict a user's intent when performing a particular graphical user interface action. The second type of model is a task specific model 314, which may be used specifically to make predictions related to a particular use case, as will be described in more detail later. Overall, the intent model 312 and the task specific model 314 types are both language models trained to understand semantics about particular interactions, especially text-based ones such as entering text in a text box or selecting a filter, performed by a user in the graphical user interface. For example, in the case where the interaction information will be used to recommend a job listing for a user, the language models may be trained to understand job semantics and to capture job seeker intent through their sessions.

One example of a task specific model 314 (and thus one example use case) is an extreme classification task. In search, one can predict queries based on the UAVs. These predicted queries can be used in the search domain in a number of different ways, such as in determining when to send alerts, when to retrieve additional tokens, or as a feature in ranking of search results. The extreme classification tooling and training data construction can be abstracted into a task specific model 314 and stored in a library for reuse.

Another example of a task specific model 314 (and thus one example use case) is top-K similar users, where the most similar users to a particular user are determined based on their UAVs. The UAVs may be indexed through artificial neural networks and abstracted into another artefact. Each domain can choose to add logic on top of the users returned or can define the model and pooling logic configurations appropriately to construct the artificial neural networks.

Another example of a task specific model 314 (and thus one example use case) is feature extraction. Representation of a token or a sequence of items can be effective predictors of a user's next action in certain downstream machine learning use cases. This representation may utilize the UAVs in determining how the representation should occur and which features should be extracted to be represented.

In a first example embodiment, the one or more machine learning algorithms 310 includes a Bidirectional Encoder Representations from Transformers (BERT) algorithm. Bert applies bidirectional training of a model known as a transformer to language modelling. This is in contrast to prior art solutions that looked at a text sequence either from left to right or combined left to right and right to left. A bidirectionally trained language model has a deeper sense of language context and flow than single-direction language models.

Figure 4:
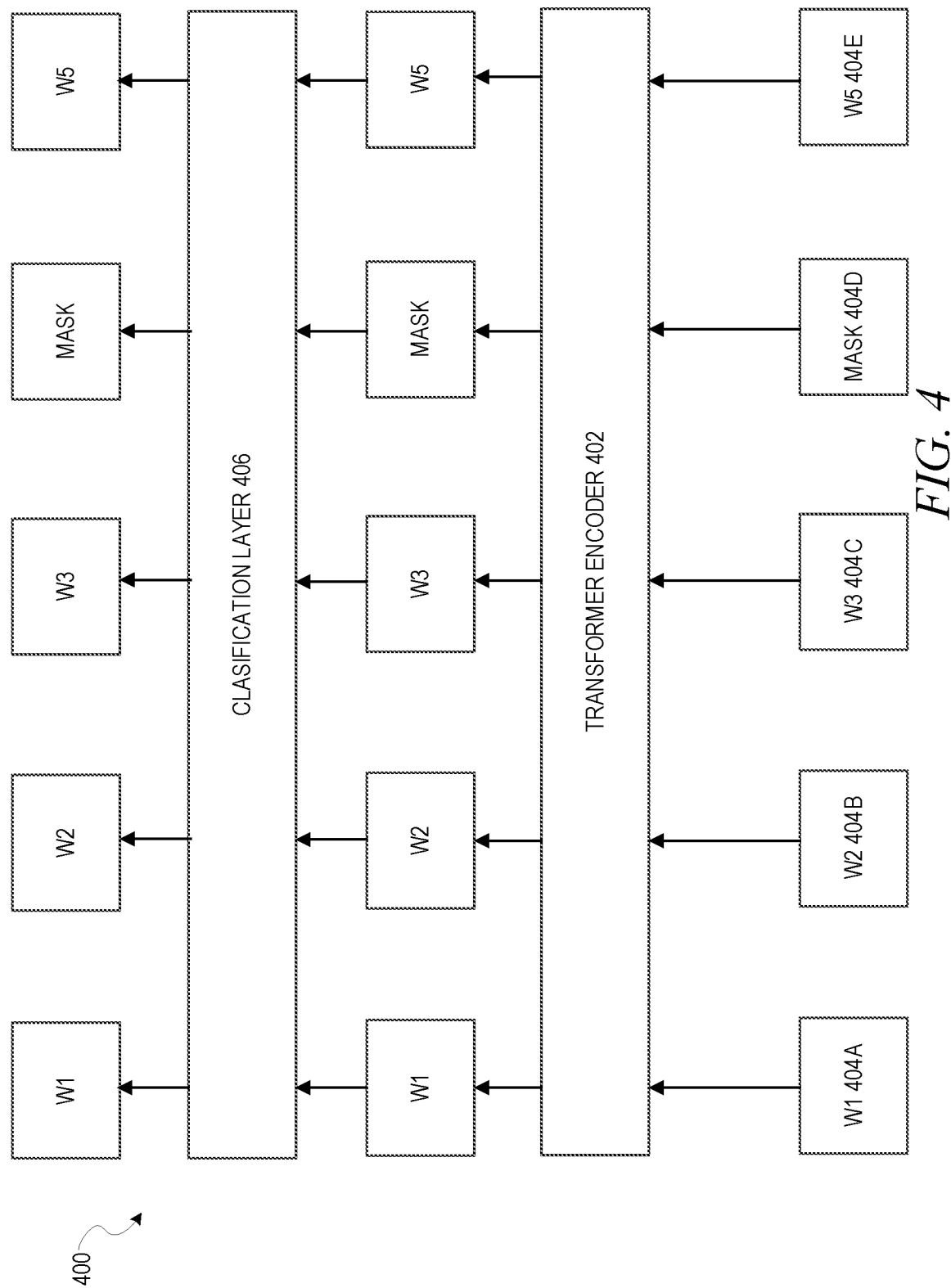
FIG. 4 is a block diagram illustrating a system including a transformer encoder, in accordance with an example embodiment.

More specifically, the transformer encoder reads the entire sequence of information at once, and thus is considered to be bidirectional (although one could argue that it is, in reality, non-directional). This characteristic allows the model to learn the context of a piece of information based on all of its surroundings. FIG. 4 is a block diagram illustrating a system 400 including a transformer encoder 402, in accordance with an example embodiment. The input is a sequence of tokens, which are first embedded into vectors and then processed in a neural network. The output is a sequence of vectors 404A-404E of size K, in which each vector corresponds to an input token with the same index. In one implementation, before feeding the vectors 404A-404E into the transformer encoder 402, a preset number of the vectors 404A-404E are replaced with a mask token. The model then attempts to predict the original value of the masked pieces of information, based on the context provided by the other, non-masked, pieces of information in the sequence. A classification layer 406 is added on top of the encoder output and the output vectors are multiplied by an embedding matrix, transforming them into a vocabulary dimension. The probability of each piece of information in the vocabulary can be calculated with softmax or a similar function.

In a second example embodiment, the one or more machine learning algorithms 310 includes a FastText algorithm. FastText is a library for learning web embedding and text classification. The model allows the creation of an unsupervised learning or supervised learning algorithm for obtaining vector representations for pieces of information. It is based on a skipgram model, where each piece of information is represented as a bag of character n-grams. A vector representation is associated to each character n-gram, with pieces of information being represented as the sum of these representations.

In a third example embodiment, the one or more machine learning algorithms 310 include a neural network, such as a graph convolutional network (GCN). It breaks down an input into smaller pieces and performs feature extractions to make a classification decision. The CGN alternates between convolution and pooling layers. The convolution layers pass a filter over the source input and extract the important information from each piece. The pooling layers take the extracted information and downsample it to retain only the most important information. When the essential data is extracted, it is passed through a fully connected layer to arrive at the final classification decision. The CGN performs the convolution on a graph by passing a filter over the graph, looking for essential vertices and edges that can help classify nodes within the graph.

A fine-tuning component 316 may then act to fine tune the different types of models 312, 314 to meet certain specified specific requirements. For example, if the use case is for query suggestions in a guided search, the different types of models 312, 314 may be fine-tuned to maximize for this goal. This may include, for example, performing extreme multilabel or similarity ranking. In extreme multilabel classification, a mean label representation is derived from input vectors. A negative sampling technique using HNSW on the label vectors is performed. One versus all linear classifiers are utilized using low-dim dense features. One versus all linear classifiers are trained by training a single classifier per class, with the samples of that class as positive samples and all other samples as negatives. This strategy makes the linear classifiers produce a real-valued confidence score for its decision, rather than just a class label.

An inference component 318 may then utilize an intent model 312 and the UASs 304 to perform inference for session embedding. Specifically, the intent model creates a UAV for each combination of user and session. A pooling component 320 may then pool together various combinations of member activity vectors. For example, multiple member activity vectors for the same user can be pooled to create short-term or long-term intent vectors. The short-term intent vectors may combine member activity vectors for the most recent k sessions, where k is an integer that is preconfigured. The long-term intent vectors may combine member activity vectors for the most recent m sessions, where m is greater than k. The result is a set of pooled member activity vectors 322.

A task specific model 314 may then be applied to the pooled member activity vectors 322 to obtain a set of member entities 324. The pooled member activity vectors 322 and/or set of member entities 324 may then be utilized by one or more downstream components 326 to make one or more predictions of, or related to, user intent derived from the pooled member activity vectors 322, using the task-specific model 314 (or another similarly trained model). These one or more downstream components 326 will be described in more detail below.

FIG. 5 is a diagram illustrating an example UAS 500, in accordance with the example embodiment. Here, the session was defined as all interactions with a social networking service via a graphical user interface until 30 minutes of inactivity. In this example, the user has performed eleven such interactions 502A-502K, which are stored as array elements of a one-dimensional array in the UAS (for readability, the interactions are depicted on different lines but the entire UAS would be a single one-dimensional array at the storage level).

Referring back to FIG. 3, in an example embodiment, the one or more downstream components 326 may include a jobseeker segment expansion component. The jobseeker segment expansion component segments users into multiple buckets with respect to their intent when job searching using the graphical user interface: active/expanded, passive/expanded, and dormant. The pooled member activity vectors 322 capture job-seeking behavior of users on a daily basis. A task-specific model 314 may build a nearest neighbor index based on the corpus of hundreds of pooled member activity vectors 322. As such, it can be used to improve the recall of expansion in an unsupervised way, thus more reliably predicting job-seekers to target.

In another example embodiment, the one or more downstream components 326 may include a search/recommender ranking component. The search/recommender ranking component may use the pooled member activity vectors 322 and other predictive entities, such as next queries and job titles, as features in a search and recommender machine learned model, providing richer signals about member's behavior in the graphical user interface, thereby improving their search and discovery experience.

In another example embodiment, the one or more downstream components 326 may include a job recommender component. The job recommender component may use the pooled member activity vectors 322 to predict a next set of queries, or job-titles, from the current state of users. By using recent member activity across channels, the job recommender component can more accurately predict interesting job listings for a user, e.g., ones that are more personalized based on recent user activity.

Figure 6:
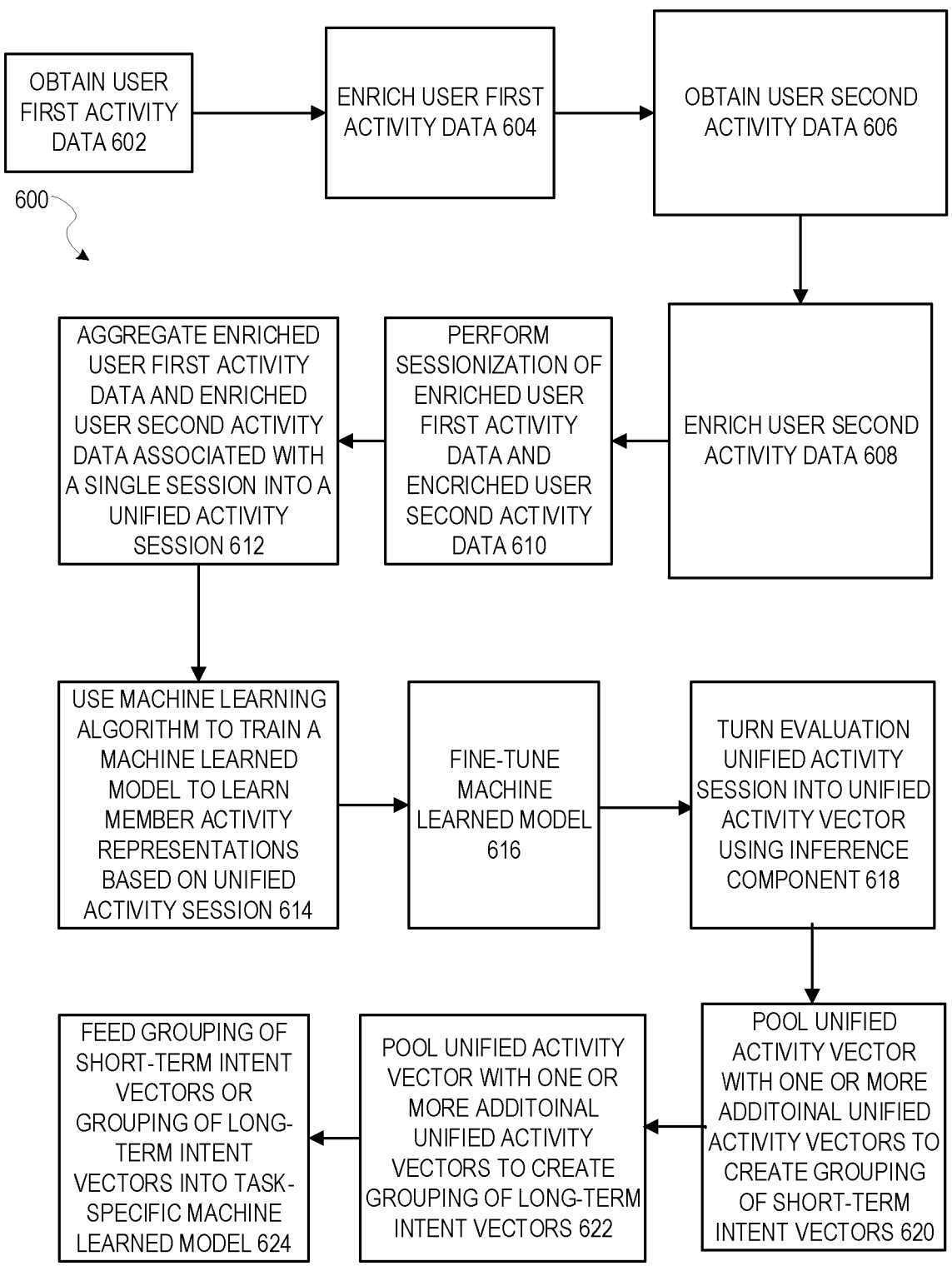
FIG. 6 is a flow diagram illustrating a method for using a machine learning algorithm to train a machine learned model, in accordance with an example embodiment.

FIG. 6 is a flow diagram illustrating a method 600 for using a machine learning algorithm to train a machine learned model, in accordance with an example embodiment. At operation 602, user first activity data is obtained from a first channel within an online network. The user first activity data describes one or more user interactions, via a graphical user interface, with the first channel. At operation 604, the user first activity data is enriched with one or more pieces of additional information defined for the first channel. At operation 606, user second activity data is obtained from a second channel within the online network. The second channel is different from the first channel and the user second activity data describes one or more user interactions, via the graphical user interface, with the second channel. At operation 608, the user second activity data is enriched with one or more pieces of additional information defined for the second channel.

At operation 610, sessionization of the enriched user first activity data and the enriched user second activity data is performed. The sessionization groups data into sessions based on a predefined length of inactivity between sessions. At operation 612, enriched user first activity data and user second activity data associated with a single session are aggregated into a unified activity session. At operation 614, a machine learning algorithm is used to train a machine learned model to learn member activity representations based on the unified activity session. At operation 616, the machine learned model is fine-tuned based on a defined goal of use of output of the machine learned model.

At this stage the training of the machine learned model has been completed, and similar unified activity sessions can be formed for evaluation purposes (or some of the same unified activity sessions used for training can be reused for evaluation).

At operation 618, an evaluation unified activity session is turned into a unified activity vector by an inference component that uses the member activity representations from the machine learned model to make one or more inferences about the activities in the evaluation unified activity session. At operation 620, the unified activity vector is pooled with one or more additional evaluation unified activity vectors from a k most recent sessions for a user to create a grouping of short-term intent vectors. At operation 622, the unified activity vector is pooled with one or more additional unified activity vectors from an m most recent sessions for the user to create a grouping of long-term intent vectors. At operation 624, either the grouping of short-term intent vectors or the grouping of long-term intent vectors is fed into a task specific machine learned model to produce a prediction of, or related to, user intent. The selection of the grouping of short-term intent vectors or long-term intent vectors is based on the task specific machine learned model.

Figure 7:
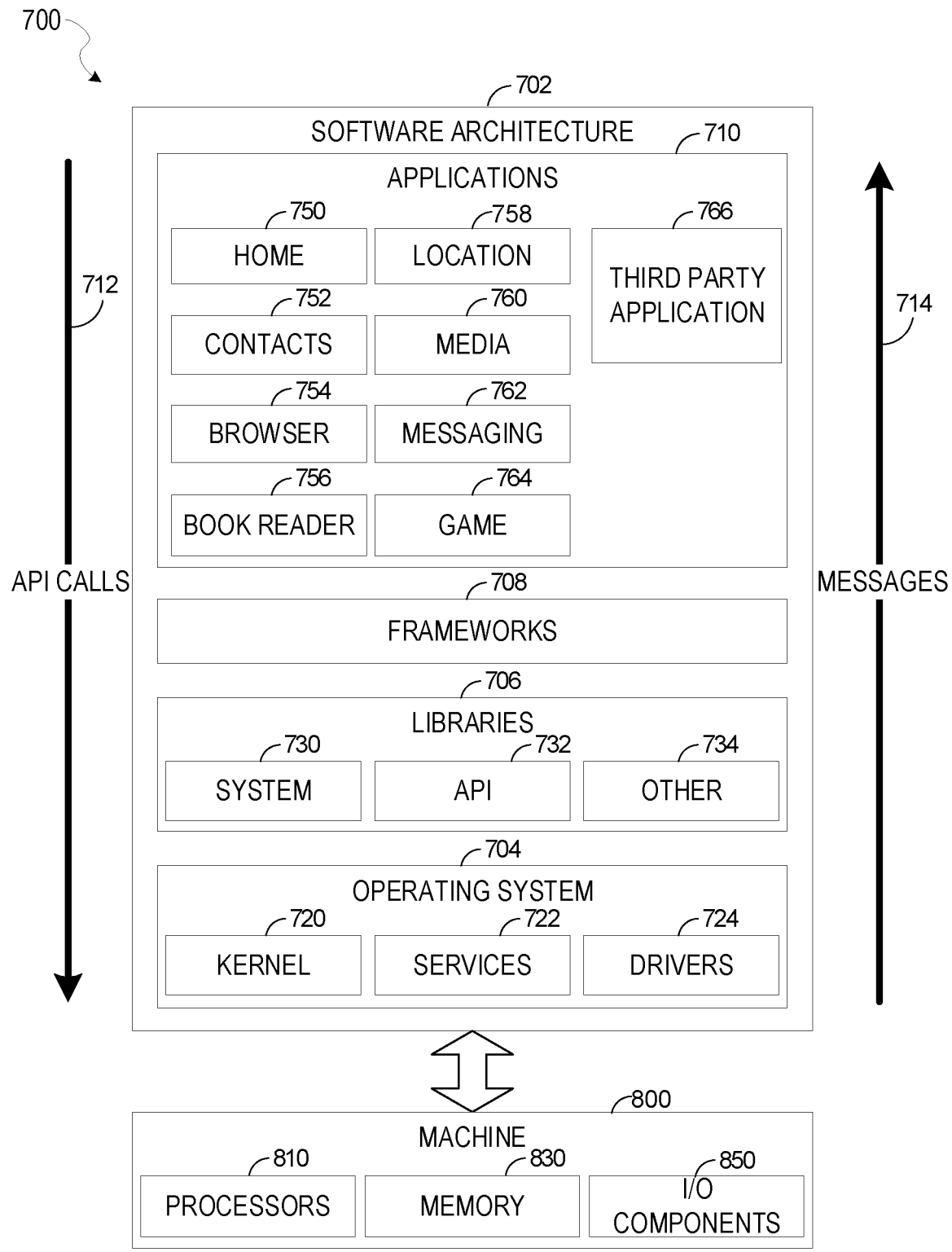
FIG. 7 is a block diagram illustrating a software architecture, in accordance with an example embodiment.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
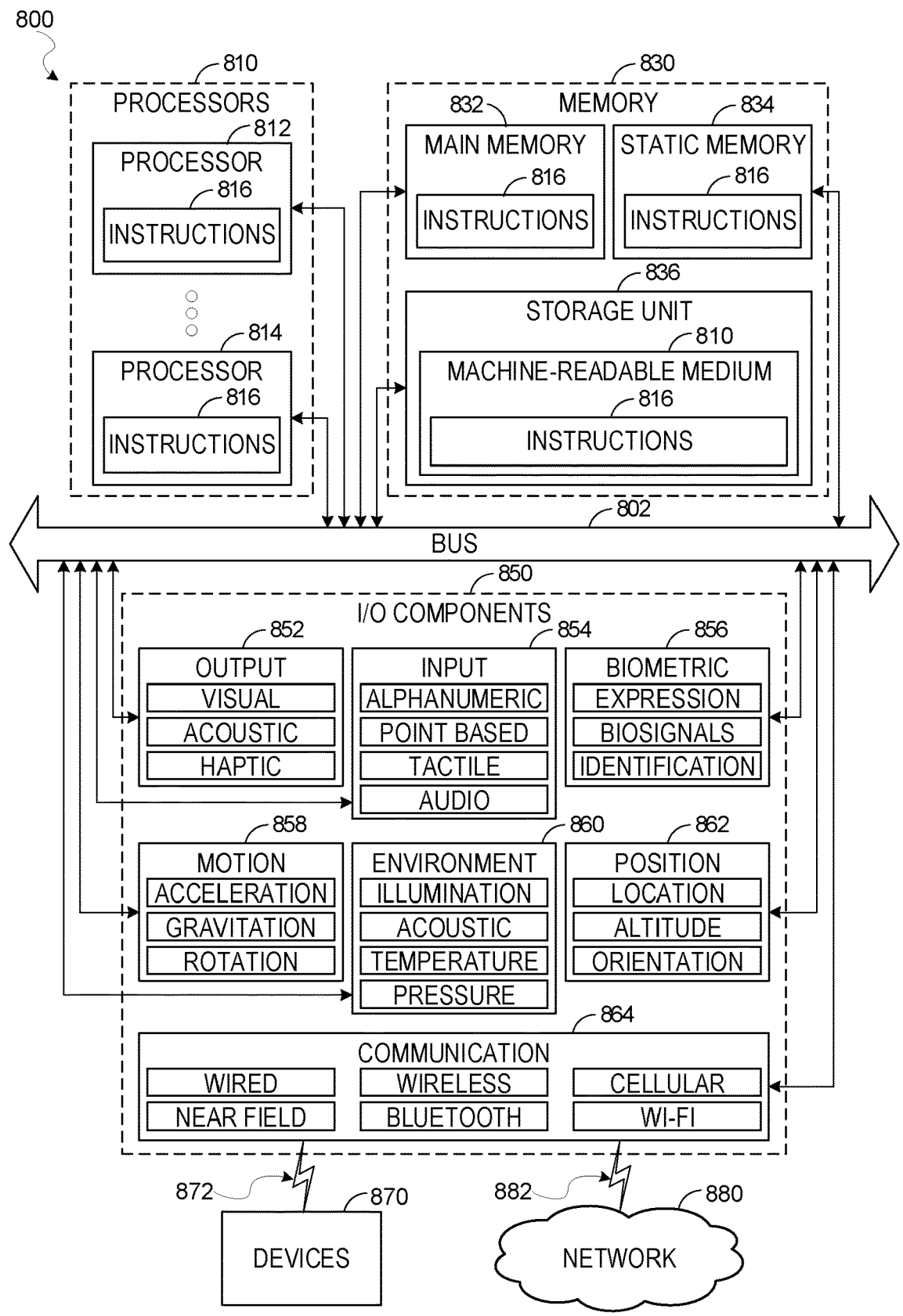
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application 710, an applet, an app, or other executable code) for causing the machine 800 to perform any one or more of the methodologies discussed herein may be executed. For example, the instructions 816 may cause the machine 800 to execute the method 600 of FIG. 6. Additionally, or alternatively, the instructions 816 may implement FIGS. 1-6, and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors 812 (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor), multiple processors 810 with a single core, multiple processors 810 with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine 800 will depend on the type of machine 800. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms, other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 816 and/or data. The terms shall accordingly be taken to include, but not be limited to, solid-state memories, and optical and magnetic media, including memory internal or external to the processors 810. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS)

technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 816 may be transmitted or received over the network 880 using a transmission medium via a network interface device (e.g., a network interface component included in the communication components 864) and utilizing any one of a number of well-known transfer protocols (e.g., HTTP). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    a computer-readable medium having instructions stored thereon, which, when executed by a processor, cause the system to perform operations comprising:
    obtaining user first activity data from a first channel within an online network, the user first activity data describing one or more user interactions, via a graphical user interface, with the first channel;
    enriching the user first activity data by adding one or more pieces of additional information defined for the first channel;
    obtaining user second activity data from a second channel within the online network, wherein the second channel is different than the first channel, the user second activity data describing one or more user interactions, via the graphical user interface, with the second channel;
    enriching the user second activity data by adding one or more pieces of additional information defined for the second channel;
    performing sessionization of the enriched user first activity data and the enriched user second activity data, the sessionization grouping data into sessions based on a predefined length of inactivity between sessions;
    aggregating enriched user first activity data and user second activity data associated with a single session into a unified activity session; and
    training, using a machine learning algorithm, a machine learned model to learn member activity representations based on the unified activity session;
    wherein the unified activity session is turned into a unified activity vector by an inference module using the machine learned model and pooled with one or more additional unified activity vectors from a k most recent sessions for a user to create a grouping of short-term intent vectors.

2. The system of claim 1, wherein the operations further comprise: fine-tuning the machine learned model by modifying the machine learned model based on a defined downstream use of output of the machine learned model.

3. The system of claim 1, wherein the machine learning algorithm is a Bidirectional Encoder Representations from Transformers (BERT) algorithm.

4. The system of claim 3, wherein the BERT algorithm uses a transformer encoder to read an entire sequence of information from the aggregating enriched user first activity data and user second activity at once.

5. The system of claim 1, wherein the machine learned model is a neural network.

6. The system of claim 5, wherein the neural network is a graph convolutional network.

7. The system of claim 1, wherein the machine learning algorithm is a FastText algorithm.

8. The system of claim 1, wherein the unified activity vector is pooled with one or more additional unified activity vectors from an m most recent sessions for a user to create a grouping of long-term intent vectors.

9. The system of claim 8, further comprising feeding the grouping of short-term intent vectors or the grouping of long-term intent vectors into a task specific machine learned model to produce a prediction of user intent or related to user intent, the selection of the grouping of short-term intent vectors or long-term intent vectors based on the task specific machine learned model.

10. A computerized method comprising:
    obtaining user first activity data from a first channel within an online network, the user first activity data describing one or more user interactions, via a graphical user interface, with the first channel;
    enriching the user first activity data by adding one or more pieces of additional information defined for the first channel;
    obtaining user second activity data from a second channel within the online network, wherein the second channel is different than the first channel, the user second activity data describing one or more user interactions, via the graphical user interface, with the second channel;
    enriching the user second activity data by adding one or more pieces of additional information defined for the second channel;
    performing sessionization of the enriched user first activity data and the enriched user second activity data, the sessionization grouping data into sessions based on a predefined length of inactivity between sessions;
    aggregating enriched user first activity data and user second activity data associated with a single session into a unified activity session; and
    training, using a machine learning algorithm, a machine learned model to learn member activity representations based on the unified activity session;
    wherein the unified activity session is turned into a unified activity vector by an inference module using the machine learned model and pooled with one or more additional unified activity vectors from a k most recent sessions for a user to create a grouping of short-term intent vectors.

11. The method of claim 10, wherein the operations further comprise: fine-tuning the machine learned model by modifying the machine learned model based on a defined downstream use of output of the machine learned model.

12. The method of claim 10, wherein the machine learning algorithm is a Bidirectional Encoder Representations from Transformers (BERT) algorithm.

13. The method of claim 10, wherein the machine learned model is a neural network.

14. The method of claim 13, wherein the neural network is a graph convolutional network.

15. The method of claim 10, wherein the machine learning algorithm is a FastText algorithm.

16. The method of claim 10, wherein the unified activity session is pooled with one or more additional unified activity sessions from a k most recent sessions for a user to create a grouping of short-term intent vectors.

17. The method of claim 10, wherein the unified activity vector is pooled with one or more additional unified activity vectors from an m most recent sessions for a user to create a grouping of long-term intent vectors.

18. A non-transitory machine-readable storage medium comprising instructions which, when implemented by one or more machines, cause the one or more machines to perform operations comprising:
obtaining user first activity data from a first channel within an online network, the user first activity data describing one or more user interactions, via a graphical user interface, with the first channel;
enriching the user first activity data by adding one or more pieces of additional information defined for the first channel;
obtaining user second activity data from a second channel within the online network, wherein the second channel is different than the first channel, the user second activity data describing one or more user interactions, via the graphical user interface, with the second channel;
enriching the user second activity data by adding one or more pieces of additional information defined for the second channel;
performing sessionization of the enriched user first activity data and the enriched user second activity data, the sessionization grouping data into sessions based on a predefined length of inactivity between sessions;
aggregating enriched user first activity data and user second activity data associated with a single session into a unified activity session; and
training, using a machine learning algorithm, a machine learned model to learn member activity representations based on the unified activity session;
wherein the unified activity session is turned into a unified activity vector by an inference module using the machine learned model and pooled with one or more additional unified activity vectors from a k most recent sessions for a user to create a grouping of short-term intent vectors.

* * * * *